Figure 2:
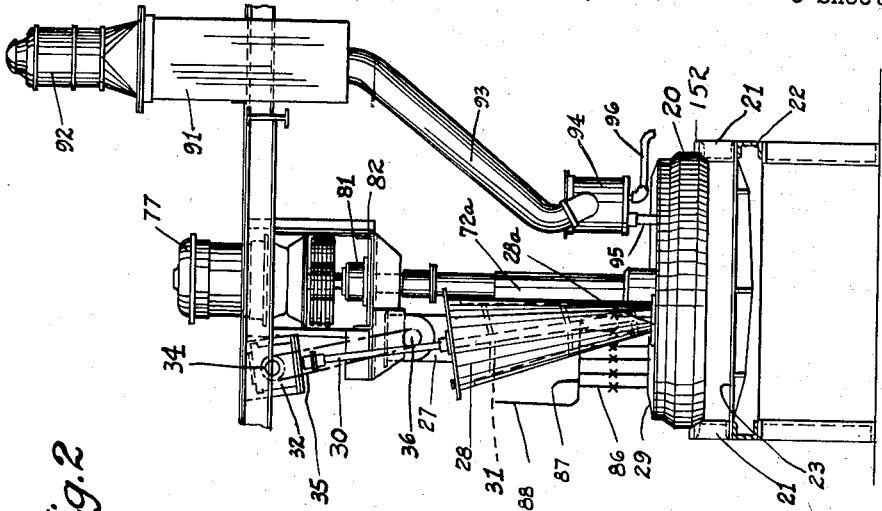

Nov. 5, 1940.　　　　O. M. KNODE　　　　2,220,683

MIXER

Filed Dec. 22, 1938　　　　6 Sheets-Sheet 1

INVENTOR
OLIVER M. KNODE
BY
L. A. Paley
ATTORNEY

Nov. 5, 1940.  O. M. KNODE  2,220,683
MIXER
Filed Dec. 22, 1938  6 Sheets-Sheet 2

INVENTOR
OLIVER M. KNODE
BY
L. A. Paley
ATTORNEY

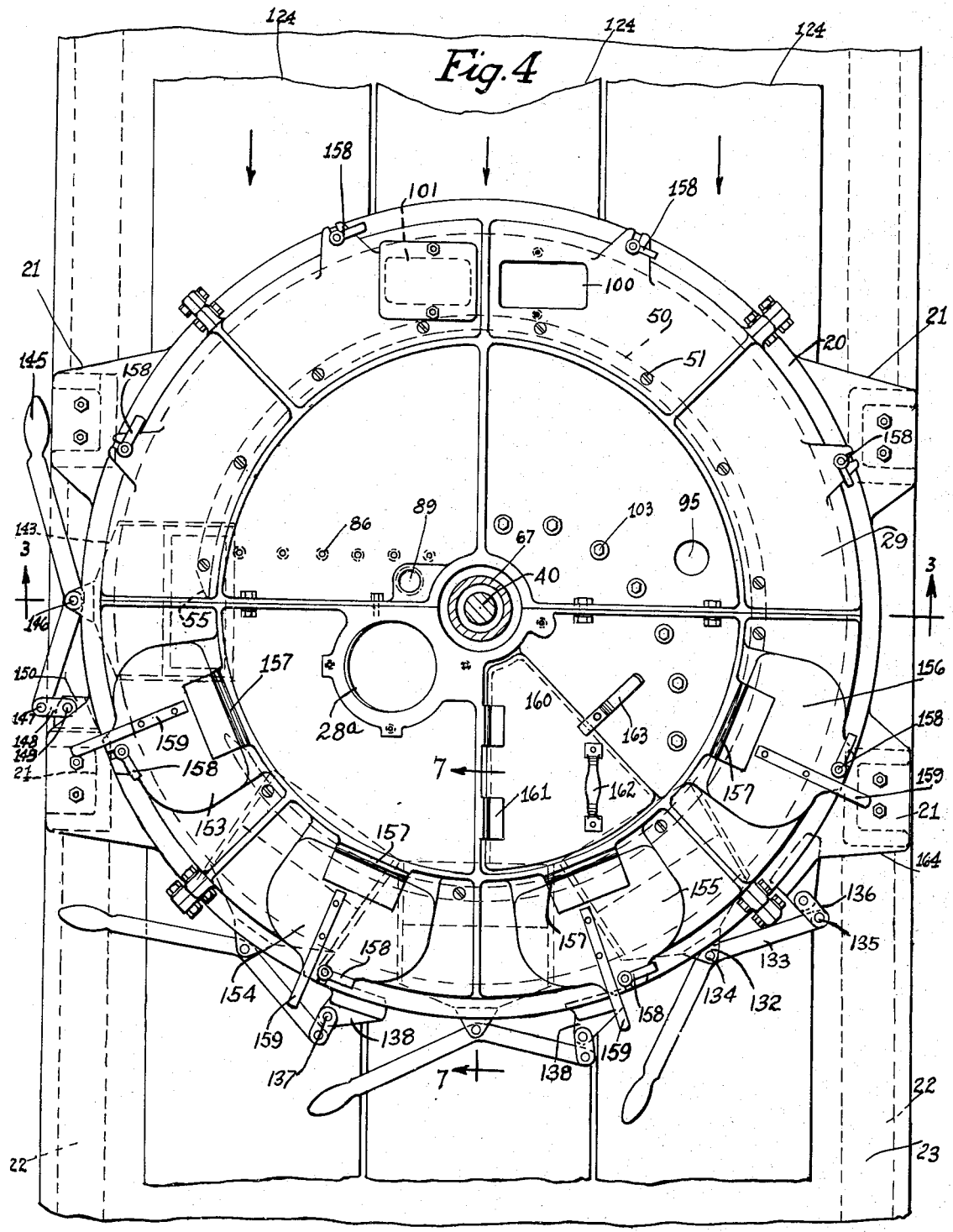

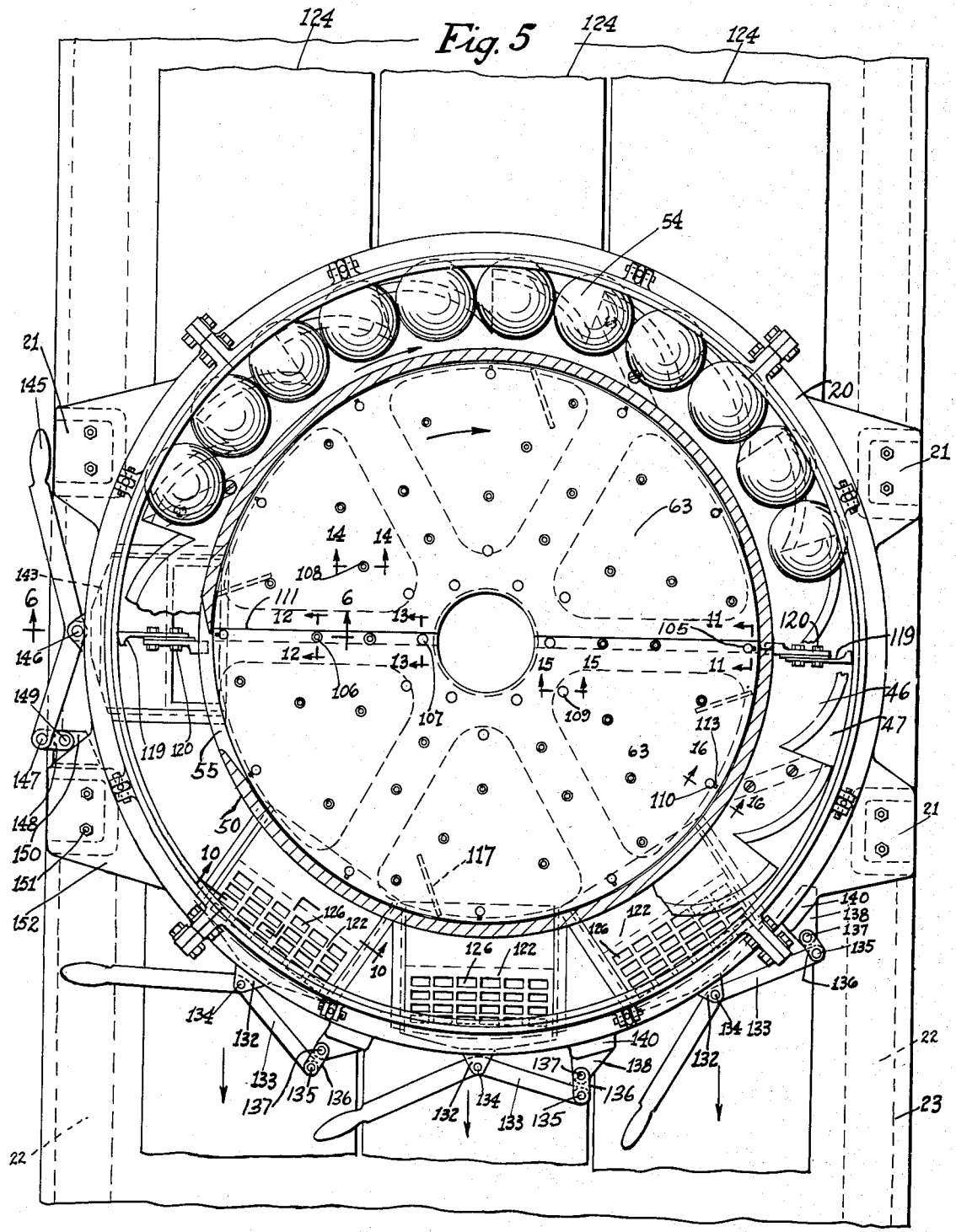

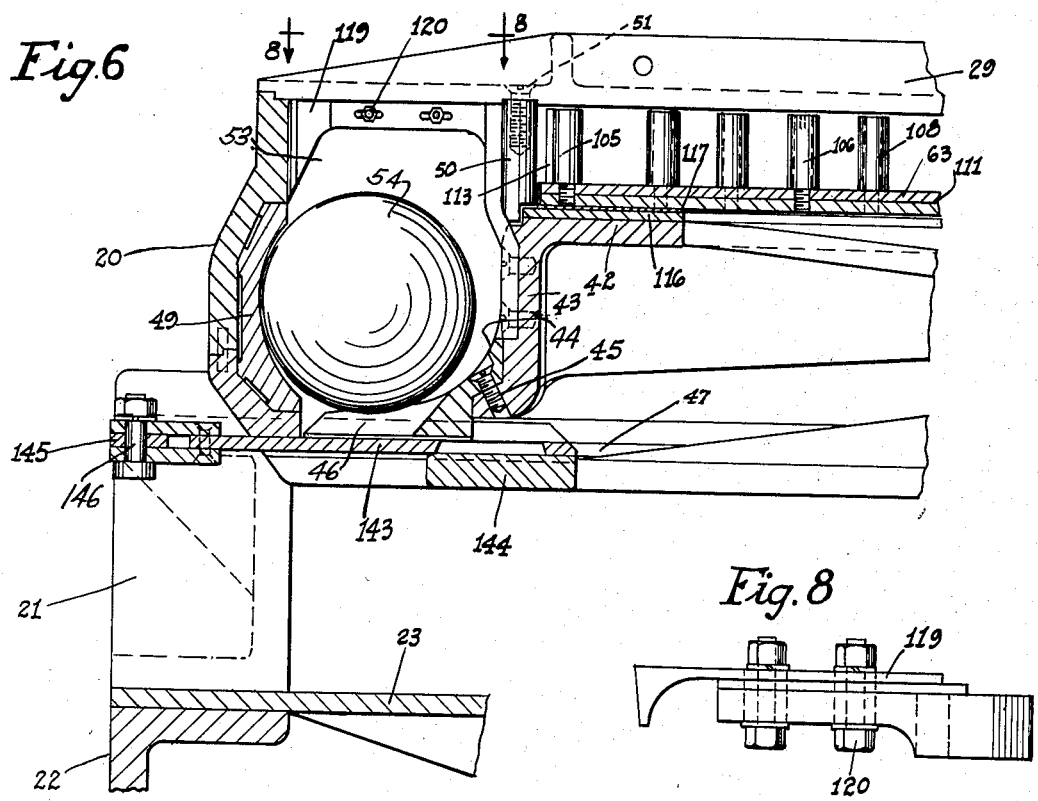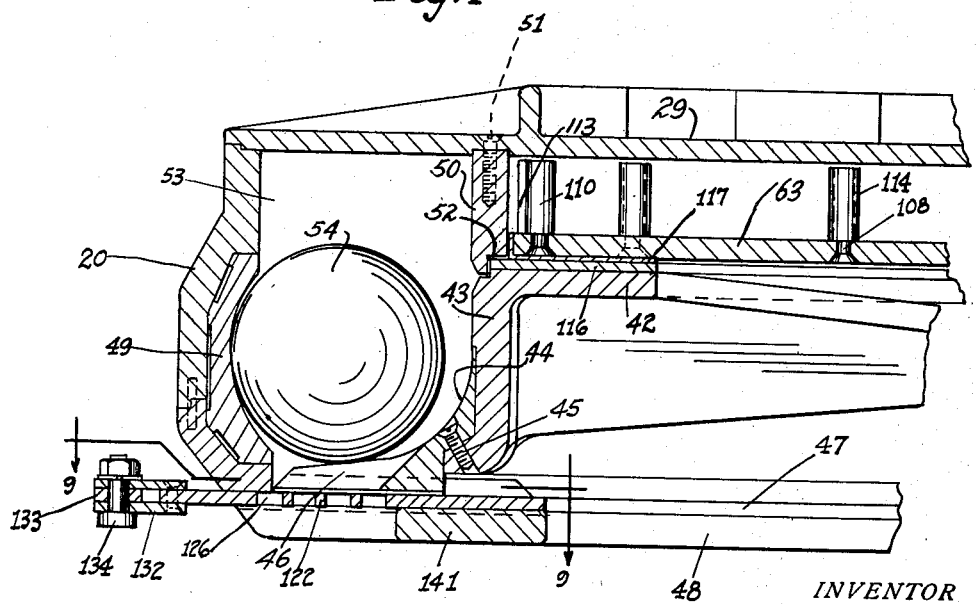

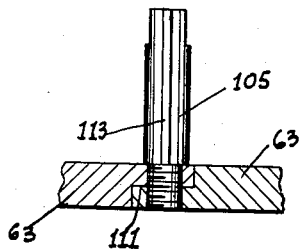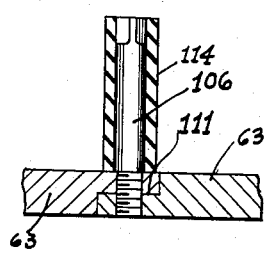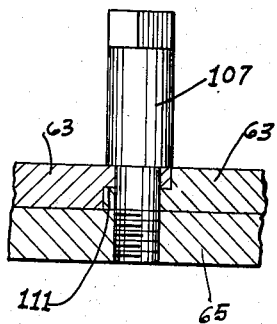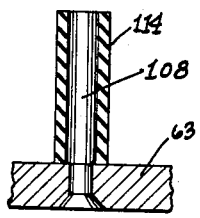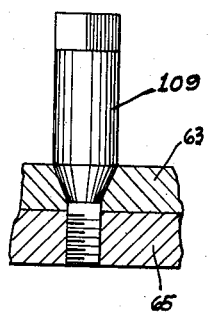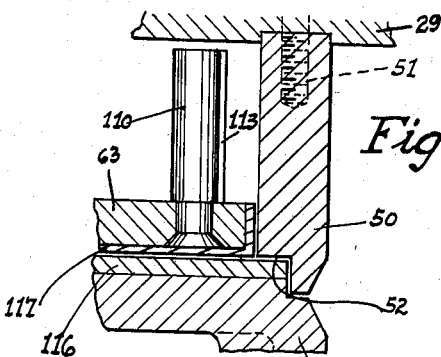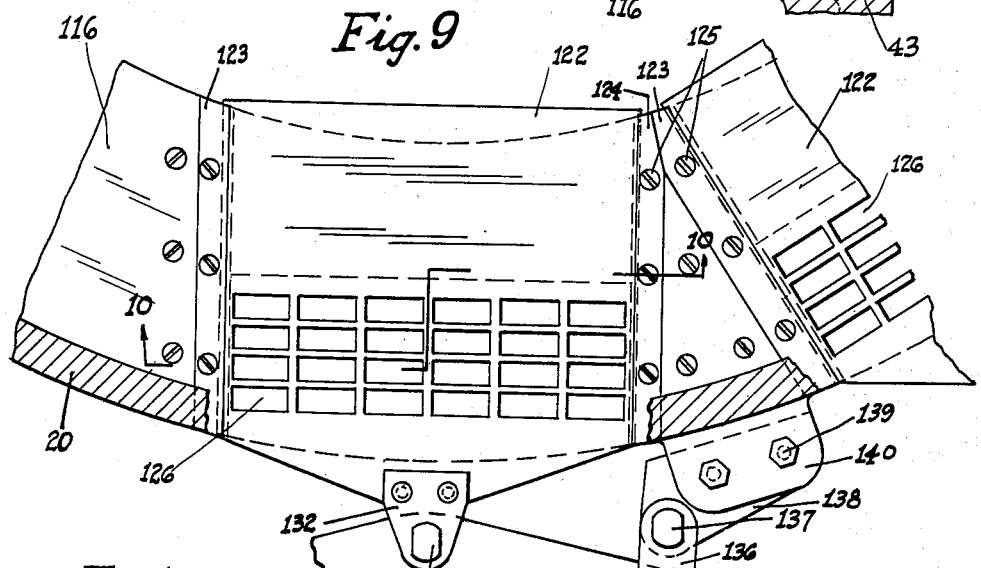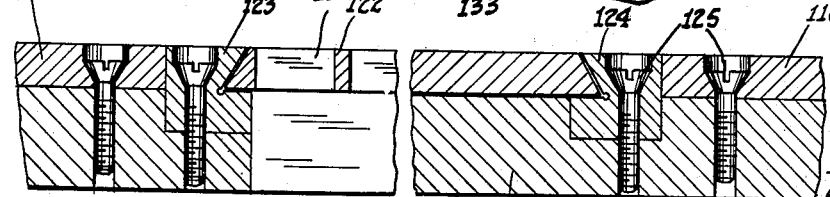

Patented Nov. 5, 1940

2,220,683

UNITED STATES PATENT OFFICE 2,220,683

MIXER

Oliver M. Knode, Winnetka, Ill., assignor to United States Gypsum Company, Chicago, Ill., a corporation of Illinois Application December 22, 1938, Serial No. 247,232

6 Claims. (Cl. 259—152)

This invention relates to mixers, and has reference more particularly to mixers for preparing mixtures of calcined gypsum or other cementitious materials with water, foam and other ingredients.

In the manufacture of gypsum boards, it is customary to deposit a plastic mixture of calcined gypsum, water, foam, fiber or other ingredients, between paper cover sheets. The board is rolled flat by the master roll of the board machine, is conveyed along a setting conveyer to permit setting of the cementitious core, is cut into the desired board lengths, and then passed through a drying kiln to complete the manufacturing operation. In the mixing of the ingredients forming the plastic mixture, various types of mixers have been proposed. High speed centrifugal mixers have been used to provide a substantially instantaneous "soaking" or mixing of the calcined gypsum and fiber with water. It has been customary to discharge the high speed mixer into a slow speed mixer into which foam is introduced to be mixed with the slurry from the high speed mixer. Some effort has been made to eliminate the slow speed mixer and introduce the foam into the high speed mixer, but this has not been entirely satisfactory due to the breaking of the foam bubbles because of the violence of the mixing operation, and because of the difficulty of splitting the discharge into a plurality of streams for the manufacture of multiple streams of plaster board. The use of the combined high speed and slow speed mixers is somewhat wasteful in space and the calcined gypsum has a tendency to build up in the duct where the two mixers are connected.

Among the high speed mixers which have been proposed is one disclosed in Patent No. 1,758,200 to Pfeffer and Trotter and Patent No. 2,097,088 to Mills. Slow speed mixers are disclosed by Patent No. 1,767,791 to Gough, McNeil and Pfeffer and Patent No. 1,813,828 to Turner and Absmeier.

An object of the invention therefore is to combine a high speed and slow speed mixer into one concentric machine.

Another object of the invention is to produce a combination mixer which may be conveniently attached to a board machine with a minimum of space requirement.

A further object of the invention is to provide a combination mixer in which the slurry is delivered from the high speed compartment to the low speed compartment without building up set gypsum.

A still further object of the invention is to provide a combination mixer in which the slurry may be easily split into multiple streams; also to improve mixers and mixing methods in other respects hereinafter specified and claimed.

Figure 1:
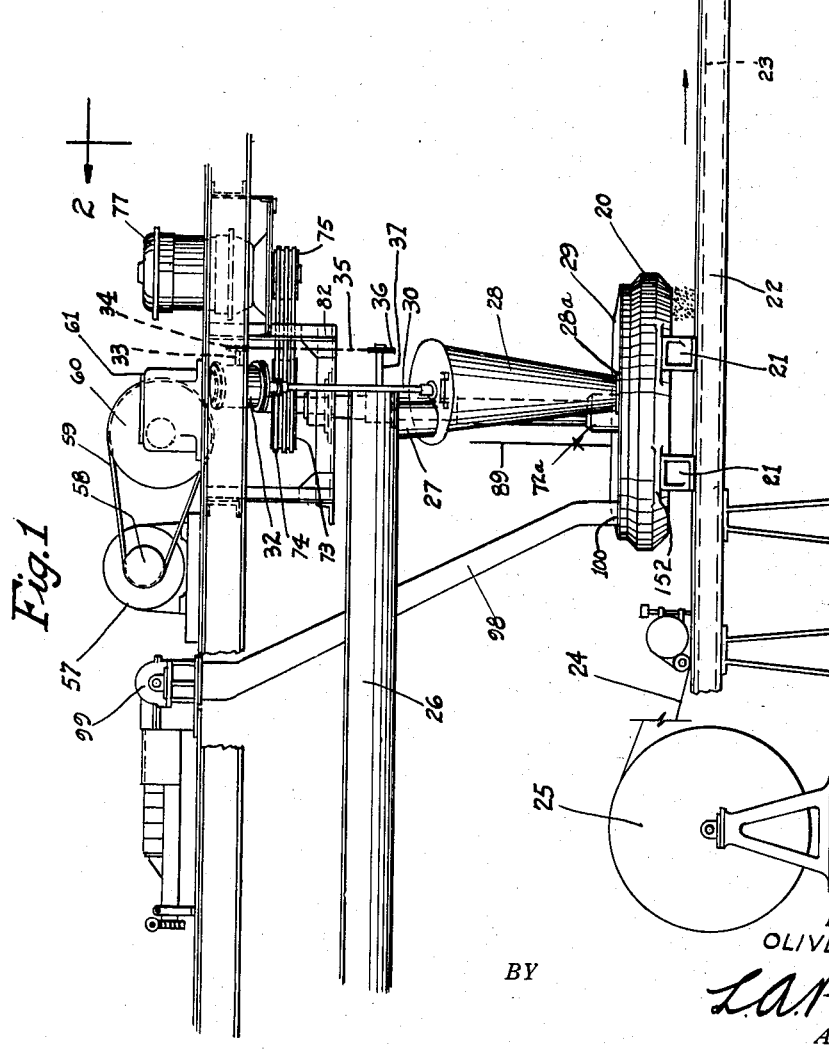
Figure 3:
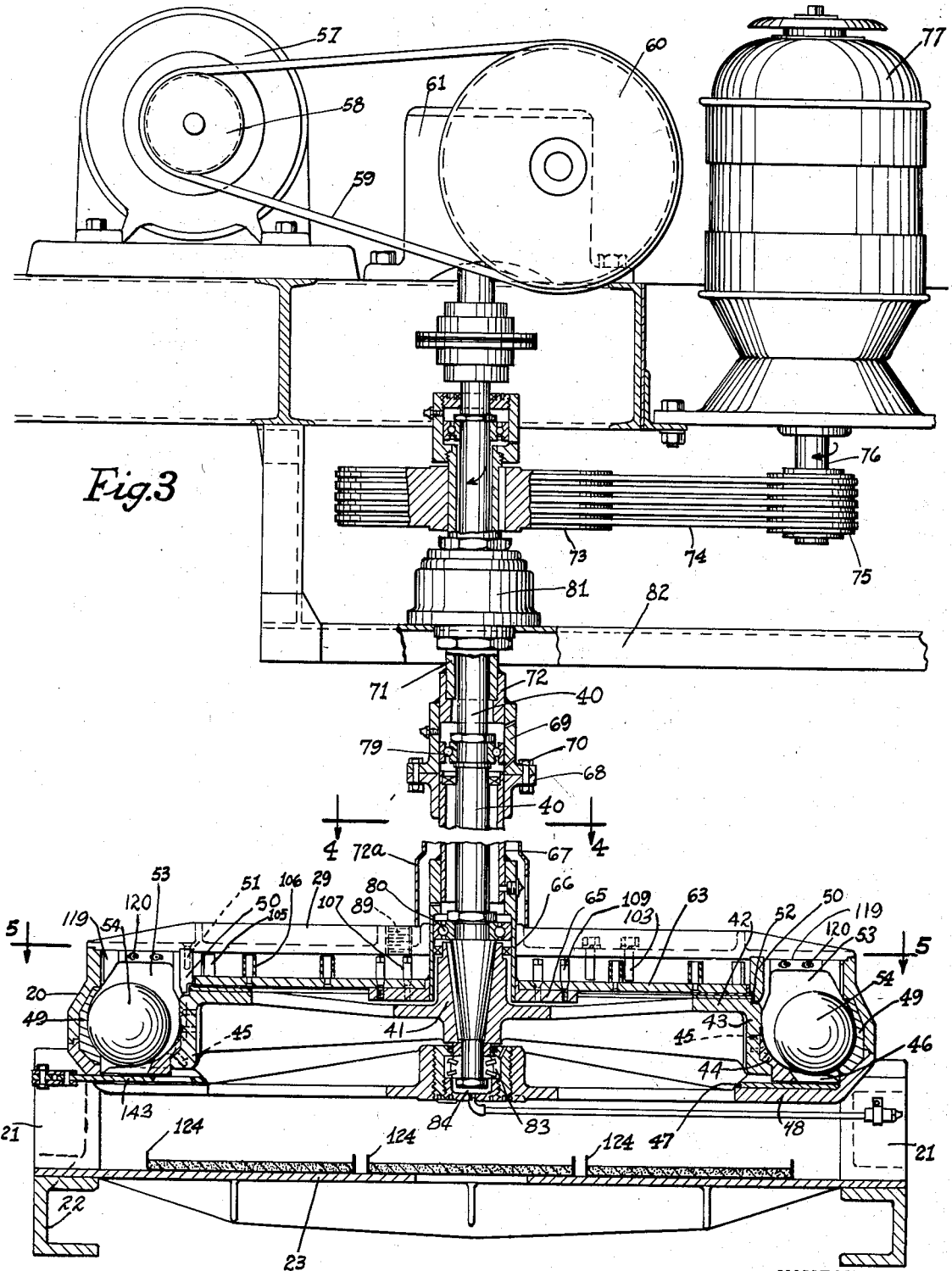

Reference is to be had to the accompanying drawings forming a part of this specification, in which Fig. 1 is an elevation of a part of a board machine with my improved mixer in position, Fig. 2 is a sectional elevation through the board machine taken on line 2—2 of Fig. 1, Fig. 3 is a sectional elevation through the mixer, Fig. 4 is a sectional plan view through the mixer taken on line 4—4 of Fig. 3, Fig. 5 is a sectional plan view of the mixer taken on line 5—5 of Fig. 3, Fig. 6 is a sectional elevation through the mixer taken on line 6—6 of Fig. 5, Fig. 7 is a sectional elevation through the mixer taken on line 7—7 of Fig. 4, Fig. 8 is an enlarged plan view of a scraper, Fig. 9 is a sectional plan view of the clean-out gate, Fig. 10 is a sectional elevation through the clean-out gate taken on line 10—10 of Fig. 9, and Figs. 11 to 16, inclusive, are sectional elevations through the mixer pins taken on lines 11—11, to 16—16, respectively, of Fig. 5.

In the practice of my invention, I provide a mixer bowl 20 which is supported by brackets 21 on the frame 22 of a gypsum board machine. A suitable table 23 is suported by the frame 22 and three lower cover strips of paper 24 unwind from roll 25 and pass over table 23. Calcined gypsum stucco, or other cementitious material is continuously conveyed from a bin not shown, by a screw conveyor 26 to an outlet duct 27 which extends into a self-cleaning spout 28, the latter being connected at its lower end to a port 28a on cover 29 for the mixer. A shaft 30 extends into the spout 28 and carries scraper arms 31 which serve to keep the powdered gypsum free from the inside of spout 28 as shaft 30 rotates. The shaft 30 is rotated through gears in a gear box 32, stub shaft 33, sprocket 34, chain 35, and sprocket 36, the latter being secured to a driven screw conveyor shaft 37.

A shaft 40 extends through the cover 29 and is keyed near the lower end thereof to a rotor hub 41 on which is formed a rotor disc 42. An annular outstanding flange 43 is formed around the periphery of disc 42 and an annular rim 44 arcuate in cross section is attached to the outside of flange 43 by screws 45. Scraper teeth 46 are formed around the outside of rim 44, said teeth being arranged to scrape on an annular wear plate 47 mounted on bottom 48 of bowl 20. An annular wear plate 49 is provided around the inside of bowl 20. An annular flange or ring 50 is secured by screws 51 to the cover 29 and a dovetailed edge 52 of the flange 50 loosely fits with the rotor 42. An annular mixing chamber 53 is thus formed around the periphery of the bowl 20 and a series of mixing balls 54 is contained in said chamber 53 to roll around said chamber and to accomplish the mixing of gypsum slurry delivered to said chamber 53 through opening 55 formed in the flange 50. The shaft 40 is slowly rotated by a motor 57, pulley 58, belt 59, pulley 60 and speed reducer 61.

A high speed mixing disc 63 is rotatably mounted above the rotor 42 being secured to an annular flange 65 which is welded or otherwise secured to the bottom of a tube 66. A tube 67 telescopes into and is secured to the tube 66, a flange 68 on the upper end of tube 67 being secured to a flange 69 by bolts 70. A tube 71 extends about shaft 40 and is connected by collar 72 to the flange 69. A tubular guard 72a is placed about the tube 67 on cover 29. A pulley 73 is secured to the tube 71, and V belts 74 connect said pulley 73 to a motor pulley 75 on a motor shaft 76 of motor 77. Ball bearings 79 and 80 are provided between the shaft 40 and tube 67 and a bearing 81 mounted on frame 82 rotatably supports the tube 71. The lower end of shaft 40 is rotatably mounted in a bearing 83 which is provided with suitable oiling devices 84.

Water pipes 86 are connected at their lower ends to the mixer cover 29 so as to introduce water into the mixer into the chamber on top of disc 63 to form a slurry with the dry stucco and fiber introduced through the spout 28. The upper ends of pipes 86 are connected to a water manifold 87 which in turn is connected by a supply pipe 88 to a source of water. Water for flushing out the interior of the mixer bowl, is introduced through pipe 89 which is connected to the mixer cover 29. Foam is produced in a foam cell 91 of conventional design, which is driven by a motor 92. A pipe 93 leads from the foam cell 91 and is connected to a foam feeder 94. A pipe 95 connects the foam feeder 94 to the mixer cover 29 so as to deliver foam onto the top of disc 63. A drain pipe 96 leads from the foam feeder 94 for use when the equipment is shut down. Gypsum accelerator is introduced into chamber 53 through a pipe 98 which leads from a gypsum block grinding equipment 99 to a port 100 formed in the cover 29. If necessary commercial retarder may be introduced into the chamber 53 through a port 101 formed in the cover 29.

In order to accomplish a thorough and almost instantaneous mixing of the materials introduced onto the top of rapidly rotating disc 63, I provide a series of fixed pins 103 extending downwardly from the bottom of cover 29 and terminating just above the upper surface of disc 63. These pins are arranged along a curved line as best seen in Fig. 4. As the rotation of the disc 63 is clockwise, this curved arrangement of pins 103 tends to throw the material being mixed toward the periphery of the disc 63 and out through the opening 55 into chamber 53. Additional pins 105, 106, 107, 108, 109, and 110 are secured to the upper face of disc 63 so as to rotate between the pins 103 and subject the slurry to a violent mixing action as it passes outwardly toward the opening 55. The disc 63 is preferably constructed in two halves with a lap edge 111 at the junction. Pins 105, 106 and 107 pass through the lap edge 111 to rigidly join the two halves of the disc 63 together. Pins 105 and 110 have outwardly extending ribs 113 of hardened metal to act as cleaners or scrapers to keep the inside of the ring 50 free of set gypsum. Pins 106 and 108 are provided with a soft rubber tube covering 114 to prevent the building up of set gypsum on said pins. A wearing plate 116 is secured to the top of rotor disc 42 and hardened metal scrapers 117 engage the disc 42 to keep said disc 42 free of set gypsum. Sectional scrapers 119 with adjusting bolts 120 are secured to the flange 43 so as to engage the upper part of chamber 53 and prevent the formation of set gypsum.

The slurry mixed in the chamber 53 is subjected to a mild mixing action by the balls 54 so as to insure the thorough incorporation of the foam in the slurry without breaking up the individual air bubbles of the foam. The teeth 46 travel over gates 122 which are slidably received in dovetail slides 123 and 124 secured in the bottom of bowl 20 by bolts 125. A plurality of discharge openings or ports 126 is provided in about half of each gate 122 so that the amount of slurry discharged from each gate 122 can be regulated by sliding said gate so that more or less of said ports 126 are opened. A plurality of gates 122 is provided so that the slurry is discharged in a plurality of streams, such as three in number. Three continuous strips of paper 24 pass under the gates 122 so as to receive the streams of slurry. A bracket 132 is secured to each gate 122 and a lever 133 is pivoted intermediate its ends to a pivot pin 134 on said bracket. The end of each lever 133 is pivoted by a pin 135 to a link 136 which in turn is pivoted by pin 137 to a bracket 138. Bolts 139 secure the bracket 138 to a flange 140 formed on the bowl 20. A plate 141 partially underlies the gate 122 to act as a closure for the ports 126. A clean-out gate 143 is positioned at the side of the mixer over a closure plate 144. A lever 145 is pivoted intermediate its ends by a pin 146 to the gate 143. The end of lever 145 is pivoted by a pin 147 to a link 148 which is pivoted by pin 149 to a flange 150 formed on a flange 152 on mixer bowl 20. Bolts 151 connect the flanges 152 to the brackets 21. When the gate 143 is opened, wash water introduced into the mixer through pipe 89 will flush out the interior of the mixer and discharge past gate 143 to the side of the machine to be caught by a suitable container not shown. Suitable clean-out doors 153, 154, 155 and 156 are provided in cover 29 over the chamber 53, said doors having hinges 157, screw clamps 158 and operating handles 159. A clean-out door 160 is provided in cover 29 over the disc 63, said door having hinges 161, handle 162 and pivoted clamp 163.

In operation, calcined gypsum mixed with fiber if desired, is transferred by screw conveyor 26 to duct 27 and self-cleaning spout 28 which delivers through mixer cover 29 to the top surface of rapidly rotating disc 63. The disc 63 is secured to sleeves 66 and 71, said sleeves being rotated by means of pulleys 73 and 75, belts 74 and motor 77. Water is introduced onto the top of disc 63 through pipe 88, manifold 87 and pipes 86 which pass through the mixer cover 29. A shaft 40 passes coaxially through the sleeves 71 and 66 and a rotor disc 42 is secured to the lower end of said shaft 40. A mixing chamber 53 is formed between rotor flange 43 and the mixing bowl 20, rubber balls 54 being provided in the chamber 53 to complete the mixing of foam introduced through pipe 95. The slurry ingredients are mixed by the violent action of pins 105 to 110 on disc 63, said pins rotating between pins 103 secured to the bottom face of mixer cover 20. The mixed slurry containing the foam is discharged from the mixer bowl 20 through ports 126 in gates 122 which are opened or closed by manually operated levers 133. Three streams of slurry are discharged onto three continuously moving strips of paper 24, to form plaster boards with gypsum cores. Teeth 46 on rim 44 support the balls 54 and scrape any set gypsum from the wearing ring 47. Shaft 40 is slowly rotated by motor 57 acting through speed reducer 61, pulley 60, belt 59 and pulley 58. Accelerator is produced by block grinding device 99 which discharges gypsum powder through pipe 98 into chamber 53. Retarder may be introduced if needed into chamber 53 through opening 100. The slurry produced by the pins above disc 63 passes through opening 55 in ring 50 to chamber 53.

I would state in conclusion that while the example illustrated constitutes a practical embodiment of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. In a mixing device for preparing calcined gypsum slurries, an annular horizontal mixing chamber, mixing balls arranged to roll around said chamber, means for causing the rolling of said balls around said chamber, a disc mounted concentrically within said chamber for high speed rotation, means for introducing calcined gypsum and water to be mixed onto said disc, and means for discharging the mixed material from said chamber.

2. In a mixing device, an annular housing arranged with axis vertical, means for introducing quick-setting cementitious material and water to be mixed into said housing adjacent the center thereof, means adjacent the center of said housing to subject said material to a violent mixing action, means for dividing said housing into an inner and outer chamber, balls arranged to roll slowly around said outer chamber to further mix material delivered from said inner chamber, and means for discharging the mixed material from said housing.

3. In a mixing device, an annular housing arranged with axis vertical, means for introducing quick-setting cementitious material and water to be mixed into said housing adjacent the center thereof, a disc mounted for rapid rotation adjacent the center of said housing and arranged to violently mix the material introduced into said housing, means for dividing said housing into a pair of concentric mixing chambers constituting an inner chamber containing said disc and an outer chamber, means for introducing foam into one of said chambers, means in said outer chamber for mixing said foam with said materials with a less violent mixing action, and means for discharging the mixed material from said chamber.

4. In a mixing device, a disc arranged to rapidly rotate in a horizontal plane, a stationary cover above said disc in spaced relation thereto, means for introducing calcined gypsum and water onto the upper surface of said disc, vertically disposed pins projecting from said disc and cover in overlapping relation to accomplish the mixing of said materials to form a slurry, an annular concentric mixing chamber around the outside of said disc, an apertured ring secured to said cover and encircling said disc at the inner edge of said chamber, balls in said chamber, means for causing the rotation of said balls through said chamber at a slower speed than the rotative speed of said disc, and means for discharging the mixed slurry from said chamber in a plurality of streams.

5. In a mixing device, a pair of concentric mixing members mounted for independent rotation at different speeds and adapted to support material to be mixed, a stationary housing member cooperating with said mixing members to provide a pair of concentric mixing chambers, means for introducing quick setting cementitious material and water into the inner of said mixing chambers to be mixed by the inner mixing member and discharged into the outer mixing chamber for further mixing action by the outer mixing member, and means for discharging the mixed material from the outer mixing chamber.

6. In a mixing device, a mixing chamber adapted to receive cementitious material and water to be mixed, means within the chamber to subject the material therein to a violent mixing action, a second mixing chamber in encircling concentric relation to the first chamber to receive the mixed material from the latter, means within the second chamber to subject the material therein to a gentle mixing action, and means for discharging the mixed material from the second chamber.

OLIVER M. KNODE.